Nov. 5, 1963   E. SEIDEL   3,109,969
CAPACITOR FOR USE AT HIGH OPERATING VOLTAGES
Filed June 28, 1960
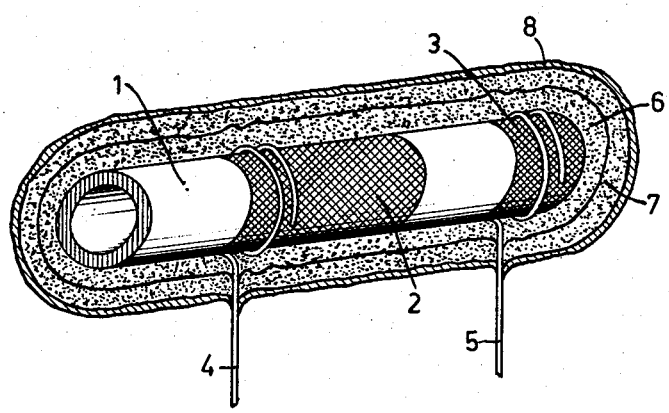
INVENTOR
EBERHARD SEIDEL
BY
AGENT

United States Patent Office 3,109,969
Patented Nov. 5, 1963

3,109,969
CAPACITOR FOR USE AT HIGH OPERATING VOLTAGES
Eberhard Seidel, Hamburg-Garstedt, Germany, assignor to North American Philips Company, Inc., New York, N.Y., a corporation of Delaware
Filed June 28, 1960, Ser. No. 39,390
Claims priority, application Germany July 11, 1959
3 Claims. (Cl. 317—258)

This invention relates to capacitors for use at high operating voltages, which are covered with a lacquer-like dipping paste so that their sharp edges are rounded.

In capacitors it is frequently necessary for the live parts, for example the electrodes, to be properly insulated from the surroundings. If such a capacitor is partly dipped in a bath of mercury for the breakdown test and one terminal of a voltage source is connected to this bath and the other to the current-supply wires of the capacitor, the latter must be capable of resisting an alternating voltage of 3 kilovolts for 1 minute.

It is known to insulate electric capacitors by covering them with cast resins. The use of cast resins, such as epoxy resins or non-saturated polyester resins, in casting moulds requires a complicated procedure and moulding technique, which is inefficient for small-size capacitors. Attempts have therefore been made to cover capacitors with molten or fluid cast resins by the dipping method in a thick layer, in order thus to avoid the moulding technique. The cast resin is subsequently hardened on the capacitors themselves in the hot or cold state. This method is neither free from objections, since complicated steps must be taken to prevent the covering from flowing away prior to solidification. Consequently, for thermo-setting cast resins a heating temperature has been chosen which is always a little below the melting point which rises with progressing polymerisation. In the case of cold hardening, the capacitors are rotated after the dipping treatment. However, in such methods, losses occur due to premature coagulation of the dipping liquid. In addition, the insulation is partly attenuated, since in practice the occlusion of air bubbles is unavoidable.

In view thereof, the aim is to abandon the cast-resin technique for insulating capacitors and to have recourse to the simpler lacquering technique wherein the lacquer provided on the capacitor by dipping sticks to the capacitor due to adhesion and immediately coagulates and does not leak off after dipping.

It is already known to cover capacitors with a lacquer-like dipping paste which simultaneously rounds all the sharp edges, corners, peaks or the like of the capacitor. Such dipping pastes are lacquer mixtures which contain for about two thirds coarse-granular fillers, such as quartz flour or calciferous spar. In addition, solvents and a small amount of muffling lacquer are added, so that the filler grains stick together during the subsequent hardening process and a porous thick covering ensues from which the solvents can escape without the layer swelling. Although with such layers provided by the dipping method and burnt in at 150° C., any sharp edges and corners and also unevennesses of the capacitors are covered, sufficient electrical insulation cannot be obtained, since the dipping pastes are non-homogeneous and porous. Their breakdown field-strength is only about 12 kilovolts/mm. Ceramic capacitors covered therewith already break down in mercury at an alternating voltage of 2 kilovolts. Even if the pores are closed by impregnation with molten paraffin, the required test voltage of 3 kilovolts for 1 minute is not reached. In many cases it is therefore necessary to provide the capacitor with an insulating layer in addition to the thick layer of dipping paste.

According to the invention, in a capacitor for use at high operating voltages, which is covered with a lacquer-like dipping paste rounding its sharp edges, there is provided on the dipping paste a highly-insulating ethyl cellulose layer of uniform thickness which dries in air.

The thickness of the insulating lacquer layer is preferably about 0.2 mm.

It is to be noted that it is known to use ethyl cellulose lacquers for insulating electric wires and for impregnating insulating cotton tissues. However, an ethyl cellulose lacquer is not suitable as the sole insulation for electric capacitors, since such a lacquer, provided in a thin layer, does not sufficiently cover the sharp edges of the ceramic material. In the first place it must therefore be ensured that the capacitors have no unevenness at their edges, which may be obtained, for example, by covering with a thick dipping paste. However, hitherto objections have been raised to the use of lacquers drying in air for electric capacitors, since it was feared that the loss factor of capacitors covered with such lacquers would become much worse due to the absorption of water by the lacquers, which cannot be neglected. The loss factor of capacitors covered by ethyl cellulose lacquers which are insensitive to moisture is substantially not varied as a result of such covering.

In order to increase the breakdown strength of the insulating layer, a thixotropating material may be added thereto in an amount of not more than about 15%, preferably about 10%, of the ethyl cellulose. The term "thixotropating material" is to be understood to mean a material which, when mixed with the ethyl cellulose layer, imparts thixotropic qualities thereto. Suitable thixotropating materials are colloidal silicic acid and/or colloidal aluminum silicates. The breakdown field-strength decreases again when more than 15% of the thixotropating material is added.

In order that the invention may be readily carried into effect, one embodiment thereof will now be described in detail, by way of example, with reference to the accompanying diagrammatic drawing showing a cross-section of a capacitor according thereto.

A ceramic tube 1, which constitutes the dielectric, is provided with electrodes 2 and 3 and two current-supply wires 4 and 5. Provided on the capacitor by dipping are two layers 6 and 7 of a porous lacquer-like dipping paste, each about 0.5 mm. thick, which are burnt in at about 150° C. Provided on the layers 6 and 7 by dipping again is a thin insulating layer 8, about 0.2 mm. thick, of an insulating lacquer on the basis of ethyl cellulose which dries in air. The insulating layer 8 may be obtained, if necessary, by dipping and drying several times. The drying period of each individual layer in air is from 1 to 2 hours.

The insulating lacquer used may be, for example, of the following composition:

65.40% by weight of solvent for ethyl cellulose consisting of 70% of aromatic hydrocarbon and 30% of alcohol;
11.76% by weight of difficulty volatile solvent, such as ethyl glycol, amyl alcohol or G.B.-ester;
1.40% by weight of tricresyl phosphate;
1.9% by weight of colloidal silicic acid, colloidal aluminium silicates or sojalecithine;
19.05% by weight of ethyl cellulose;
0.48% by weight of stabilizer for ethyl cellulose.

This insulating lacquer has a breakdown field-strength of about 70 kilovolts/mm.$^2$ and has a yellow opalescent colour.

The breakdown test of a capacitor manufactured with such a lacquer was in a mercury bath between 5 and 7 kilovolts' alternating voltage.

What is claimed is:

1. A high-voltage capacitor comprising a capacitor unit having a sharp edge and provided with lead wires, a coating of a dipping paste on the surface of the unit and being of sufficient thickness to round-off the sharp edge, and a thin highly-insulating layer of an air-dried ethyl cellulose lacquer on the surface of said coating.

2. A capacitor as defined in claim 1 in which the layer of ethyl cellulose lacquer contains a thixotropating material in an amount of not more than about 15% of the ethyl cellulose.

3. A capacitor as defined in claim 1 in which the insulating layer of ethyl cellulose contains a thixotropating material in an amount of about 10% of the ethyl cellulose.

References Cited in the file of this patent

UNITED STATES PATENTS

| | | |
|---|---|---|
| 1,844,324 | Kennedy | Feb. 9, 1932 |
| 1,929,559 | Moss | Oct. 19, 1933 |
| 2,399,313 | Ballard | Apr. 30, 1946 |
| 2,822,483 | De Jean et al. | Feb. 4, 1958 |
| 2,927,048 | Pritikin | Mar. 1, 1960 |
| 2,978,371 | Bacui | Apr. 4, 1961 |
| 2,997,403 | Searight | Aug. 22, 1961 |
| 3,021,234 | Casement | Feb. 13, 1962 |